US009503516B2

(12) United States Patent
Agarwal

(10) Patent No.: US 9,503,516 B2
(45) Date of Patent: Nov. 22, 2016

(54) CONTEXT-BASED CONTACT NOTIFICATION

(71) Applicant: MOTOROLA MOBILITY LLC, Chicago, IL (US)

(72) Inventor: Nidhi Agarwal, Bangalore (IN)

(73) Assignee: Google Technology Holdings LLC, Mountain View, CA (US)

(*) Notice: Subject to any disclaimer, the term of this patent is extended or adjusted under 35 U.S.C. 154(b) by 163 days.

(21) Appl. No.: 14/452,590

(22) Filed: Aug. 6, 2014

(65) Prior Publication Data
US 2016/0044089 A1 Feb. 11, 2016

(51) Int. Cl.
H04L 29/08 (2006.01)
H04L 12/58 (2006.01)
H04L 12/18 (2006.01)

(52) U.S. Cl.
CPC ........... *H04L 67/10* (2013.01); *H04L 12/1895* (2013.01); *H04L 51/02* (2013.01); *H04L 51/04* (2013.01)

(58) Field of Classification Search
USPC ........................................ 709/204, 206, 205
See application file for complete search history.

(56) References Cited

U.S. PATENT DOCUMENTS

| 5,434,908 | A  | 7/1995  | Klein |
| 5,832,062 | A  | 11/1998 | Drake |
| 6,177,905 | B1 | 1/2001  | Welch |
| 6,266,399 | B1 | 7/2001  | Weller et al. |
| 6,580,787 | B1 | 6/2003  | Akhteruzzaman et al. |
| 6,587,782 | B1 | 7/2003  | Nocek et al. |
| 6,622,021 | B1 | 9/2003  | Takala |
| 6,631,183 | B1 | 10/2003 | Rautila et al. |
| 6,658,095 | B1 | 12/2003 | Yaokum et al. |
| 6,731,323 | B2 | 5/2004  | Doss et al. |
| 6,789,064 | B2 | 9/2004  | Koh |
| 6,842,512 | B2 | 1/2005  | Pedersen |
| 6,850,837 | B2 | 2/2005  | Paulauskas et al. |

(Continued)

FOREIGN PATENT DOCUMENTS

| KR | 20020011668 A | 2/2002 |
| KR | 20060130799 A | 12/2006 |

(Continued)

OTHER PUBLICATIONS

0002360 [patch] Add temporary greetings to voicemail—Asterisk. org Issue Tracker [online]. Last updated: Jan. 15, 2008, Retrieved from the Internet <https:I/issues.asterisk.org/view.php?id=2360, 6 pp.

(Continued)

*Primary Examiner* — Liangche A Wang
(74) *Attorney, Agent, or Firm* — Shumaker & Sieffert, P.A.

(57) ABSTRACT

Disclosed are systems and methods for providing a context-based notification from a first device to a second device. In an embodiment, the first device is associated with a driver travelling to pick up a passenger, and the second device is associated with the passenger. Substantially at a notification point, the first device determines if, how, and when to transmit an auto-notification to the second device based on context. For example, if the passenger is not near the meeting point, then a notification is not sent, whereas if the passenger is in a conference with others, then a text rather than a call is sent. If traffic between the notification point and the meeting point is heavy, then the notification is delayed until the expected amount of travel time remains.

20 Claims, 5 Drawing Sheets

(56) References Cited

U.S. PATENT DOCUMENTS

| | | | |
|---|---|---|---|
| 7,142,656 B2 | 11/2006 | Moody et al. | |
| 7,224,966 B2 | 5/2007 | Caspi et al. | |
| 7,243,130 B2 | 7/2007 | Horvitz et al. | |
| 7,289,812 B1 | 10/2007 | Roberts et al. | |
| 7,295,662 B2 | 11/2007 | Vitikainen et al. | |
| 7,412,326 B2 | 8/2008 | Yoshioka et al. | |
| 7,444,383 B2* | 10/2008 | Horvitz | G05B 19/404 709/206 |
| 7,490,003 B2 | 2/2009 | Flynt | |
| 7,574,661 B2 | 8/2009 | Matsuura et al. | |
| 7,630,828 B2 | 12/2009 | Tajima et al. | |
| 7,640,300 B2 | 12/2009 | Wohlgemuth et al. | |
| 7,742,421 B2 | 6/2010 | Bantukul et al. | |
| 7,769,154 B1 | 8/2010 | Craft et al. | |
| 7,831,384 B2 | 11/2010 | Bill | |
| 7,835,859 B2 | 11/2010 | Bill | |
| 7,840,331 B2 | 11/2010 | Yoshioka et al. | |
| 7,847,686 B1 | 12/2010 | Atkins et al. | |
| 7,885,761 B2 | 2/2011 | Tajima et al. | |
| 7,885,762 B2 | 2/2011 | Tajima et al. | |
| 7,908,647 B1 | 3/2011 | Polis et al. | |
| 8,068,977 B2 | 11/2011 | Ozawa et al. | |
| 8,131,467 B2 | 3/2012 | Yoshioka et al. | |
| 8,166,019 B1 | 4/2012 | Lee et al. | |
| 8,170,960 B1 | 5/2012 | Bill | |
| 8,229,079 B2 | 7/2012 | Tibbits | |
| 8,385,975 B2 | 2/2013 | Forutanpour et al. | |
| 8,458,102 B2 | 6/2013 | Bill | |
| 8,498,809 B2 | 7/2013 | Bill | |
| 8,498,953 B2 | 7/2013 | Lehmann et al. | |
| 8,571,724 B2 | 10/2013 | Brennan et al. | |
| 8,572,008 B2 | 10/2013 | Ide et al. | |
| 8,831,879 B2 | 9/2014 | Stamm et al. | |
| 2002/0019835 A1 | 2/2002 | Bauer et al. | |
| 2002/0186257 A1 | 12/2002 | Cadiz et al. | |
| 2003/0073430 A1 | 4/2003 | Robertson et al. | |
| 2003/0123620 A1 | 7/2003 | Matsuyama | |
| 2004/0127217 A1 | 7/2004 | Aoki et al. | |
| 2004/0143841 A1 | 7/2004 | Wang et al. | |
| 2004/0156484 A1 | 8/2004 | Amin | |
| 2005/0037741 A1 | 2/2005 | Gilbert | |
| 2006/0031326 A1 | 2/2006 | Ovenden | |
| 2006/0117087 A1 | 6/2006 | Demsky et al. | |
| 2006/0140361 A1 | 6/2006 | Heikes et al. | |
| 2006/0148499 A1 | 7/2006 | Chie | |
| 2006/0156209 A1 | 7/2006 | Matsuura et al. | |
| 2006/0167592 A1 | 7/2006 | Kudo et al. | |
| 2006/0173841 A1 | 8/2006 | Bill | |
| 2006/0210033 A1 | 9/2006 | Grech et al. | |
| 2006/0234735 A1 | 10/2006 | Digate et al. | |
| 2006/0273930 A1 | 12/2006 | Godden | |
| 2006/0277256 A1 | 12/2006 | Tiruthani et al. | |
| 2007/0003028 A1 | 1/2007 | Korah et al. | |
| 2007/0010942 A1 | 1/2007 | Bill | |
| 2007/0042770 A1 | 2/2007 | Yasui et al. | |
| 2007/0078599 A1 | 4/2007 | Yoshioka et al. | |
| 2007/0130260 A1 | 6/2007 | Weintraub et al. | |
| 2007/0153768 A1 | 7/2007 | Jagadesan et al. | |
| 2007/0276585 A1 | 11/2007 | Hisada et al. | |
| 2007/0288157 A1 | 12/2007 | Peterman | |
| 2007/0288159 A1 | 12/2007 | Skelton | |
| 2007/0288279 A1 | 12/2007 | Haugen et al. | |
| 2008/0081641 A1 | 4/2008 | Smith et al. | |
| 2008/0086455 A1 | 4/2008 | Meisels et al. | |
| 2008/0155080 A1 | 6/2008 | Marlow et al. | |
| 2008/0167802 A1 | 7/2008 | Yoshioka et al. | |
| 2008/0167937 A1 | 7/2008 | Coughlin et al. | |
| 2008/0177462 A1 | 7/2008 | Yoshioka et al. | |
| 2008/0262667 A1 | 10/2008 | Otabe | |
| 2008/0285588 A1 | 11/2008 | Balk et al. | |
| 2009/0017803 A1 | 1/2009 | Brillhart et al. | |
| 2009/0048774 A1 | 2/2009 | Yoshioka et al. | |
| 2009/0063676 A1 | 3/2009 | Oh et al. | |
| 2009/0067593 A1 | 3/2009 | Ahlin | |
| 2009/0105934 A1 | 4/2009 | Tajima et al. | |
| 2009/1072651 | 4/2009 | Parker, II et al. | |
| 2009/0192702 A1 | 7/2009 | Bourne | |
| 2009/0248284 A1 | 10/2009 | Yoshioka et al. | |
| 2009/0300525 A1 | 12/2009 | Jolliff et al. | |
| 2009/0312946 A1 | 12/2009 | Yoshioka et al. | |
| 2010/0036601 A1 | 2/2010 | Ozawa et al. | |
| 2010/0042317 A1 | 2/2010 | Tajima et al. | |
| 2010/0075648 A1* | 3/2010 | Matsuoka | H04M 1/72566 455/418 |
| 2010/0100952 A1 | 4/2010 | Sample et al. | |
| 2010/0144377 A1 | 6/2010 | Alakontiola | |
| 2010/0159890 A1 | 6/2010 | Sigmund et al. | |
| 2010/0161213 A1 | 6/2010 | Tajima et al. | |
| 2010/0174998 A1 | 7/2010 | Lazarus et al. | |
| 2010/0190510 A1 | 7/2010 | Maranhas et al. | |
| 2010/0215157 A1 | 8/2010 | Narayan et al. | |
| 2010/0273443 A1 | 10/2010 | Forutanpour et al. | |
| 2011/0053578 A1 | 3/2011 | Rochford | |
| 2011/0090078 A1 | 4/2011 | Kim et al. | |
| 2011/0106436 A1 | 5/2011 | Bill | |
| 2011/0126184 A1 | 5/2011 | Lisboa | |
| 2011/0137831 A1 | 6/2011 | Ide et al. | |
| 2011/0137834 A1 | 6/2011 | Ide et al. | |
| 2011/0153629 A1 | 6/2011 | Lehmann et al. | |
| 2011/0161001 A1 | 6/2011 | Fink | |
| 2011/0175724 A1 | 7/2011 | Kent | |
| 2011/0225532 A1 | 9/2011 | Isert et al. | |
| 2011/0231091 A1 | 9/2011 | Gourlay et al. | |
| 2011/0238289 A1 | 9/2011 | Lehmann et al. | |
| 2011/0238755 A1 | 9/2011 | Khan et al. | |
| 2011/0246404 A1 | 10/2011 | Lehmann et al. | |
| 2011/0302116 A1 | 12/2011 | Ide et al. | |
| 2011/0313956 A1 | 12/2011 | Abe et al. | |
| 2011/0313957 A1 | 12/2011 | Ide et al. | |
| 2011/0319094 A1 | 12/2011 | Usui et al. | |
| 2012/0058778 A1 | 3/2012 | Waters et al. | |
| 2012/0063577 A1 | 3/2012 | Foster | |
| 2012/0064862 A1 | 3/2012 | Foster | |
| 2012/0102013 A1 | 4/2012 | Martini | |
| 2012/0148033 A1 | 6/2012 | Tibbits | |
| 2012/0197463 A1 | 8/2012 | Brennan et al. | |
| 2012/0221231 A1 | 8/2012 | Nagata et al. | |
| 2012/0221493 A1 | 8/2012 | Bill | |
| 2012/0271676 A1 | 10/2012 | Aravamudan et al. | |
| 2013/0036117 A1 | 2/2013 | Fisher et al. | |
| 2013/0059607 A1 | 3/2013 | Herz et al. | |
| 2013/0103300 A1 | 4/2013 | Rakthanmanon et al. | |
| 2013/0197890 A1 | 8/2013 | Ide et al. | |
| 2013/0218445 A1 | 8/2013 | Basir | |
| 2013/0262354 A1 | 10/2013 | Ide et al. | |
| 2013/0321178 A1 | 12/2013 | Jameel et al. | |
| 2013/0331067 A1* | 12/2013 | Coussemaeker | G06Q 10/10 455/412.2 |
| 2013/0344899 A1 | 12/2013 | Stamm et al. | |
| 2013/0345953 A1 | 12/2013 | Udeshi et al. | |
| 2013/0345971 A1 | 12/2013 | Stamm et al. | |
| 2014/0343841 A1* | 11/2014 | Faaborg | G01C 21/3438 701/465 |

FOREIGN PATENT DOCUMENTS

| | | |
|---|---|---|
| KR | 20100033259 A | 3/2010 |
| WO | 2006036356 A1 | 4/2006 |

OTHER PUBLICATIONS

Assigning a Temporary Greeting [online], IPOffice Phone Manager: Voicemail>Using Personal Greetings, last modified Jan. 24, 2008, retrieved from the Internet: <-http://marketingtools.avaya.com/knowledgebase/user/ipoffice/mergedProjects/phonemanager/index.htm?temporarygreetings.htm>, 2 pp.

Biggs, "GateGuru Relaunches With New Ways to Streamline Your Travel Experience," Techcrunch [online]. Apr. 26, 2013, Retrieved from the Internet: <http://techcrunch.com/2013/04/26/gategiri=relaunches-with-new-ways-to-streamline-your travel-experience//>, 3 pp.

(56) References Cited

OTHER PUBLICATIONS

FAQ—Setup Voice for Vacation [online]. "How Do I Setup Voice Mail for Vacation?" UNI User Services, last reviewed: Jul. 30, 2003, retrieved from the Internet: <http://www.uni.edu/its/us/faqs/vacavoice.htm>, 2 pp.

Felsing, Location-aware Neer app shows loved where you are, IOS Central (/Column/Ioscentral/), Jan. 5, 2011, Retrieved from http://www.macworld.com/article/1156869/neer.html, 2 pp.

Pash, "Just Landed Notifies you When It's Time to Leave for a Seamless Airport Pickup," Lifehacker, retrieved from the internet http://lifehacker.com/5916281/just-landed-notifies-you-when-its-time-to-leave-for-a-seamless-airport-pickup, Jun. 6, 2012, 2 pp.

McCarty, "With a $6 million Series A, Twist for iOS wants to ensure you'll never wait for someone again," The Next Web, Inc., retrieved from the internet http://thenextweb.com/apps/2012/07/18/with-a-6-million-series-a-twist-for-ios-wants-to-ensure-you'll-never-wait-for-someone-again, Jul. 18, 2012, 9 pp.

SyncUp—What's your ETA, retrieved from the internet, http://www.vent.am/ What's your ETA? Jul. 1, 2016, 4 pp.

Glympse—Share GPS location—Android Apps on Google Play, https://play.google.com/store/apps/details?id=com.glympse.android.glympse&hl=en, retrieved Jan. 28, 2015, 4 pp.

Whitwam, "[New App] Twist Tells Your Friends How Late You Are Running," Dec. 18, 2012, Retrieved from hllp://www.androidpol ice . com/20 12/12/18/new-app-twist-tells-your -friends-how-late-you-are-running/, 4 pp.

\* cited by examiner

CONTEXT-BASED CONTACT NOTIFICATION

TECHNICAL FIELD

The present disclosure is related generally to interactive electronic notification scheduling and, more particularly, to a system and method for providing real-time context-based notification to a recipient.

BACKGROUND

As we go about our daily lives, we often perform daily tasks that require coordination based on context such as time and location. For example, a carpool driver may routinely make a call or send a text from a particular waypoint to notify a rider that the driver is approaching a meeting point. In this way, the rider can be ready when the driver arrives some minutes later, without having to prepare early and stand waiting.

Similarly, other scenarios may require a routine notification based on context. For example, a manager travelling to a weekly meeting with staff may desire to send a notification call or text when he or she is approximately ten minutes away from the meeting site. Undoubtedly, other examples will come to mind in view of this discussion.

The present disclosure is directed to a system that may provide the context-based notification which the inventors have observed would be desirable. However, it should be appreciated that any such benefits are not a limitation on the scope of the disclosed principles or of the attached claims, except to the extent expressly noted in the claims. Additionally, the discussion of technology in this Background section is merely reflective of inventor observations or considerations and is not an indication that the discussed technology represents actual prior art. Moreover, the identification of the desirability of a certain course of action is the inventors' observation, not an art-recognized desirability.

BRIEF DESCRIPTION OF THE SEVERAL VIEWS OF THE DRAWINGS

While the appended claims set forth the features of the present techniques with particularity, these techniques, together with their objects and advantages, may be best understood from the following detailed description taken in conjunction with the accompanying drawings of which:

DETAILED DESCRIPTION

Turning now to a more detailed discussion in conjunction with the attached figures, techniques of the present disclosure are illustrated as being implemented in a suitable environment. The following description is based on embodiments of the disclosed principles and should not be taken as limiting the claims with regard to alternative embodiments that are not explicitly described herein. Thus, for example, while FIG. 1 illustrates an example mobile device within which embodiments of the disclosed principles may be implemented, it will be appreciated that many other devices such as, but not limited to laptop computers, tablet computers, personal computers, embedded automobile computing systems, and so on, may also be used.

Figure 1:
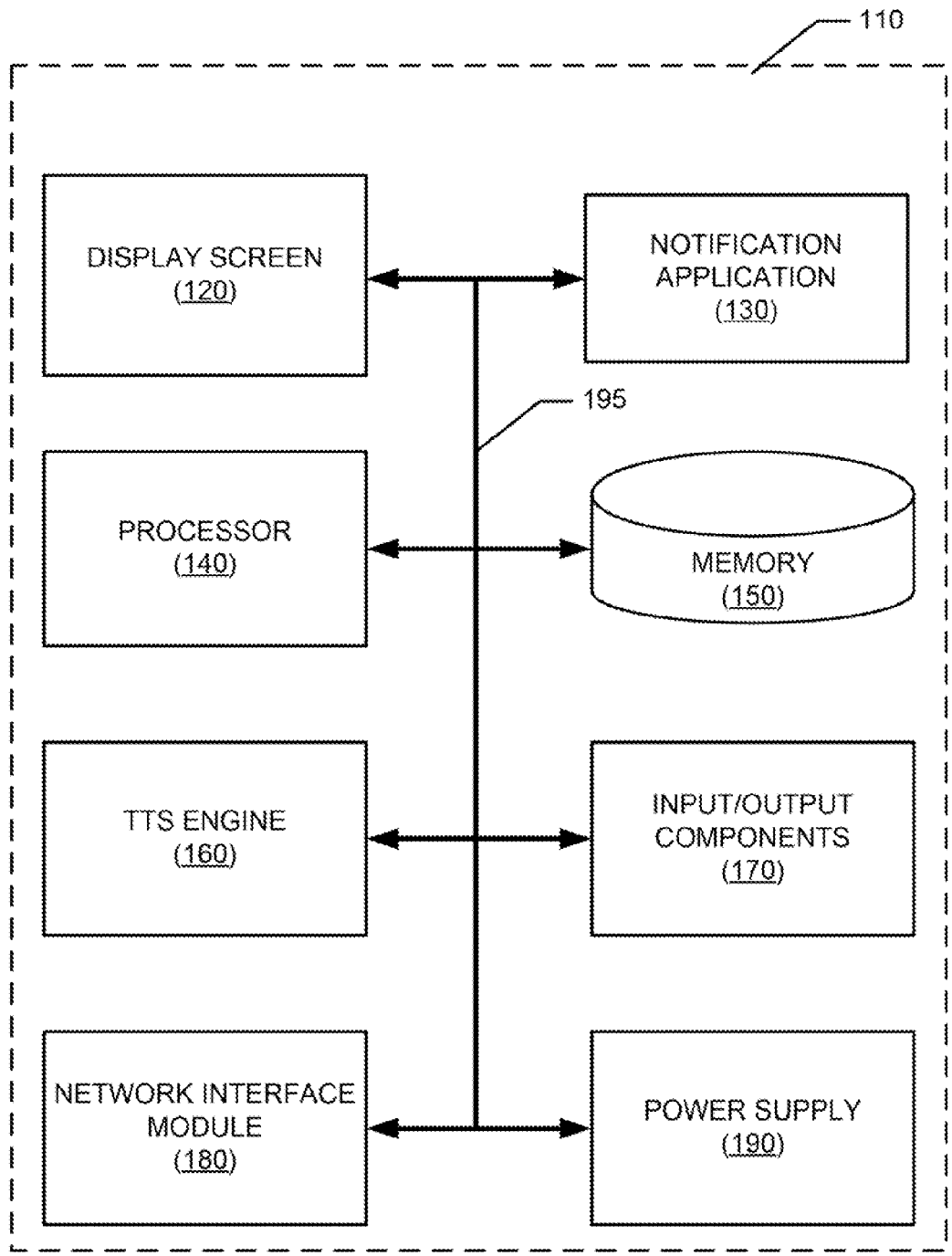
FIG. 1 is a generalized schematic of an example device within which the presently disclosed innovations may be implemented.

The schematic diagram of FIG. 1 shows an exemplary device 110 forming part of an environment within which aspects of the present disclosure may be implemented. In particular, the schematic diagram illustrates a user device 110 including several exemplary components. It will be appreciated that additional or alternative components may be used in a given implementation depending upon user preference, cost, and other considerations.

In the illustrated embodiment, the components of the user device 110 include a display screen 120, a notification application 130, a processor 140, a memory 150, a Text-To-Speech ("TTS") Engine 160, and one or more input and output components 170. The input and output components 170 include speech- and text-input facilities for example as well as text- and audible-output facilities, e.g., one or more speakers and associated facilities.

The processor 140 can be any of a microprocessor, microcomputer, application-specific integrated circuit, or the like. For example, the processor 140 can be implemented by one or more microprocessors or controllers from any desired family or manufacturer. Similarly, the memory 150 may reside on the same integrated circuit as the processor 140. Additionally or alternatively, the memory 150 may be accessed via a network, e.g., via cloud-based storage. The memory 150 may include a random-access memory. Additionally or alternatively, the memory 150 may include a read-only memory (i.e., a hard drive, flash memory, or any other desired type of memory device).

The information that is stored by the memory 150 can include program code associated with one or more operating systems or applications as well as informational data, e.g., program parameters, process data, etc. The operating system and applications are typically implemented via executable instructions stored in a non-transitory computer readable medium (e.g., memory 150) to control basic functions of the electronic device 110. Such functions may include, for example, interaction among various internal components and storage and retrieval of applications and data to and from the memory 150.

The illustrated device 110 also includes a network interface module 180 to provide wireless communications to and from the device 110. The network interface module 180 may include multiple communications interfaces, e.g., for cellular, WiFi, broadband, and other communications. A power supply 190, such as a battery, is included for providing power to the device 110 and to its components. In an embodiment, all or some of the internal components communicate with one another by way of one or more shared or dedicated internal communication links 195, such as an internal bus.

Further with respect to the applications, these typically utilize the operating system to provide more specific functionality, such as file system service and handling of protected and unprotected data stored in the memory 150. Although many applications may govern standard or required functionality of the user device 110, in many cases applications govern optional or specialized functionality, which can be provided, in some cases, by third-party vendors unrelated to the device manufacturer.

Finally, with respect to informational data, e.g., program parameters and process data, this non-executable information can be referenced, manipulated, or written by the operating system or by an application. Such informational data can include, for example, data that are preprogrammed into the device during manufacture, data that are created by the device, or any of a variety of types of information that is uploaded to, downloaded from, or otherwise accessed at, servers or other devices with which the device 110 is in communication during its ongoing operation.

In an embodiment, the device 110 is programmed such that the processor 140 and memory 150 interact with the other components of the device 110 to perform a variety of functions. The processor 140 may include or implement various modules and execute programs for initiating different activities such as launching an application, transferring data, and toggling through various graphical user interface objects (e.g., toggling through various icons that are linked to executable applications).

Figure 2:
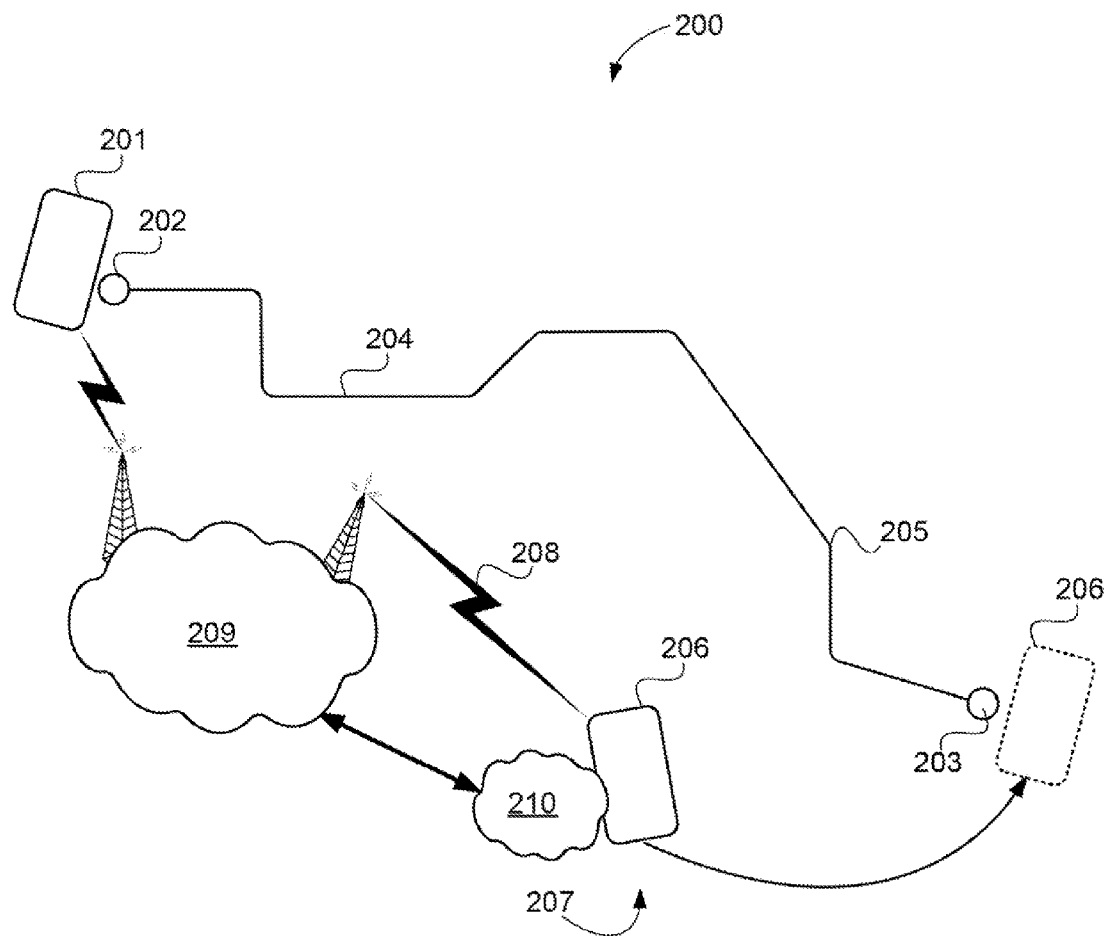
FIG. 2 is a geographical and network schematic showing an environment within which embodiments of the disclosed principles may be implemented.

Turning to FIG. 2, a device and network environment within which various embodiments of the disclosed principles may be implemented is shown. In the illustrated environment 200, a first user associated with a first user device 201 is travelling from a starting point 202 to a meeting point 203 via a travel path 204.

A notification point 205 is located at a certain location along the travel path 204, such that the notification point 205 is located a distance x and a travel time $T_t$ from the meeting location 203. A second user associated with a second user device 206 is located at a second user location 207. The second user intends to meet the first user at the meeting point 203 at a meeting time $T_m$. In an embodiment of the disclosed principles described in more detail below, an application on the first user device 201 sends an auto-notification to the second user device 206 when the first user device 201 reaches the notification point 205, letting the second user know that the first user will be at the meeting point 203 at a time $T_t$ after the notification is sent.

The time $T_t$ reflects an estimate of the time expected for the first user to travel from the notification point 205 to the meeting point 203 under generally known conditions (e.g., given the time of day and traffic conditions). However, it will be appreciated that, due to minor everyday variations, e.g., minor traffic-flow perturbations, random pedestrian crossings, signal timing, accidents, and so on, the actual time required to travel from the notification point 205 to the meeting point 203 will almost never be exactly $T_t$. Indeed, such variations may cause the actual time to vary from the estimated time $T_t$ by 10%, for example. As such, in an embodiment, the system compares currently predicted travel times to $T_t \pm 10\%$ (or±another predetermined tolerance value) rather than to $T_t$ itself. This broader value is sometimes referred to herein as being "substantially $T_t$" or a "substantially known time."

As illustrated, the first user device 201 and the second user device 206 are in communication via a cellular network 208 in an embodiment of the disclosed principles. The cellular network 208 may include multiple cellular towers as well as one or more networks such as the Internet 209. Alternatively, at least the second user device 206 may connect to the Internet 209 via a WiFi network 210 or via another local wireless network.

As noted above, there are routine daily tasks that device users execute that may benefit from context-based automated coordination. While there are certain systems that attempt to provide solutions in this area, none have fully solved the problem. For example, a carpool passenger may receive a notification from the carpool driver and respond with a text, but the ability to contextually convert that text is not provided. Moreover, adaptive changes to passenger-side alarms based on dynamic traffic events are not supported or enabled by existing technology.

In overview, the described principles provide three general stages to automatically notify the recipient's device (the examples herein will refer to a carpool passenger as the recipient) via the notifier's device (the examples herein will refer to the carpool driver as the notifier). The first stage of the described process is activation, wherein the application is made aware of the user and of the user's preferences. Activation may be executed either in a manual mode or in an automatic mode for initial setup.

This stage allows the user to activate the service. In the manual mode, the user can perform initial setup and activation manually. For example, the user, upon launching the application, may be presented with an option to provide details such as the recipient's cellular number and email address, meeting location, message template, notification mechanism preference, time it should take to reach the meeting location from the notification waypoint, etc. The user then activates the service.

In the automatic mode, the device may be activated to observe the user's driving, location, and notification patterns for a period and to save learned patterns as the user's behavioral pattern information. The device then makes suggestions to the user accordingly regarding the service, e.g.: "You are 6 minutes from the weekday morning meeting point assuming you maintain your present speed. Would you like to send a text notification to Ted?"

In an embodiment, once activation is executed, then every time the user reaches the pre-configured location, the application performs a number of steps before performing an auto-notification. In particular, the device first checks the calendar of the recipient to determine the type of notification to use (but only if the user has not specified a preferred notification type to use as a default).

The application may then send a silent location request to the recipient's device to determine if the recipient is out of the office, travelling, or is actually in close proximity (set with a default value, but configurable) of the meeting location. Optionally, if the meeting location is configured by the user, then the application also checks traffic conditions between the notification location and the meeting location to determine whether the predetermined notification lead time is actually accurate to reach the meeting location and adjusts the timing of the notification message accordingly.

After the checks discussed above are performed, and the information is gathered, the application takes several possible steps in an embodiment based on the information gathered and on the user template. A message is built to be sent, and a notification is automatically sent to auto-notify the recipient based on the type of notification selected during setup.

If the type of notification selected is "Call," or if the user has set the preferred notification type as "Call," then the device's TTS Engine may be used to generate speech for the message created. This speech output can be saved in a temporary audio file which can be used in an auto-call once the call is established with the recipient.

In an embodiment, the auto-notify service accommodates situations wherein the user's device is not able to notify the recipient (due to network unavailability, failure to answer, or other reason). In such cases, the application defers to another notification mechanism depending on the reason for notification failure. For example, if the reason for notification failure is that the call was not answered, then a text message may be sent, whereas if the reason for notification failure is an apparent lack of connectivity or that the device is not on, then a message which can be accessed over WiFi (e.g., an email message, a TextFree message, etc.) may be sent.

If the type of notification is selected to be "Text message," or if the user has set the preferred notification type as "Text Message," then the device may use the created message built to send a message to the recipient using the native default messaging application.

Figure 3:
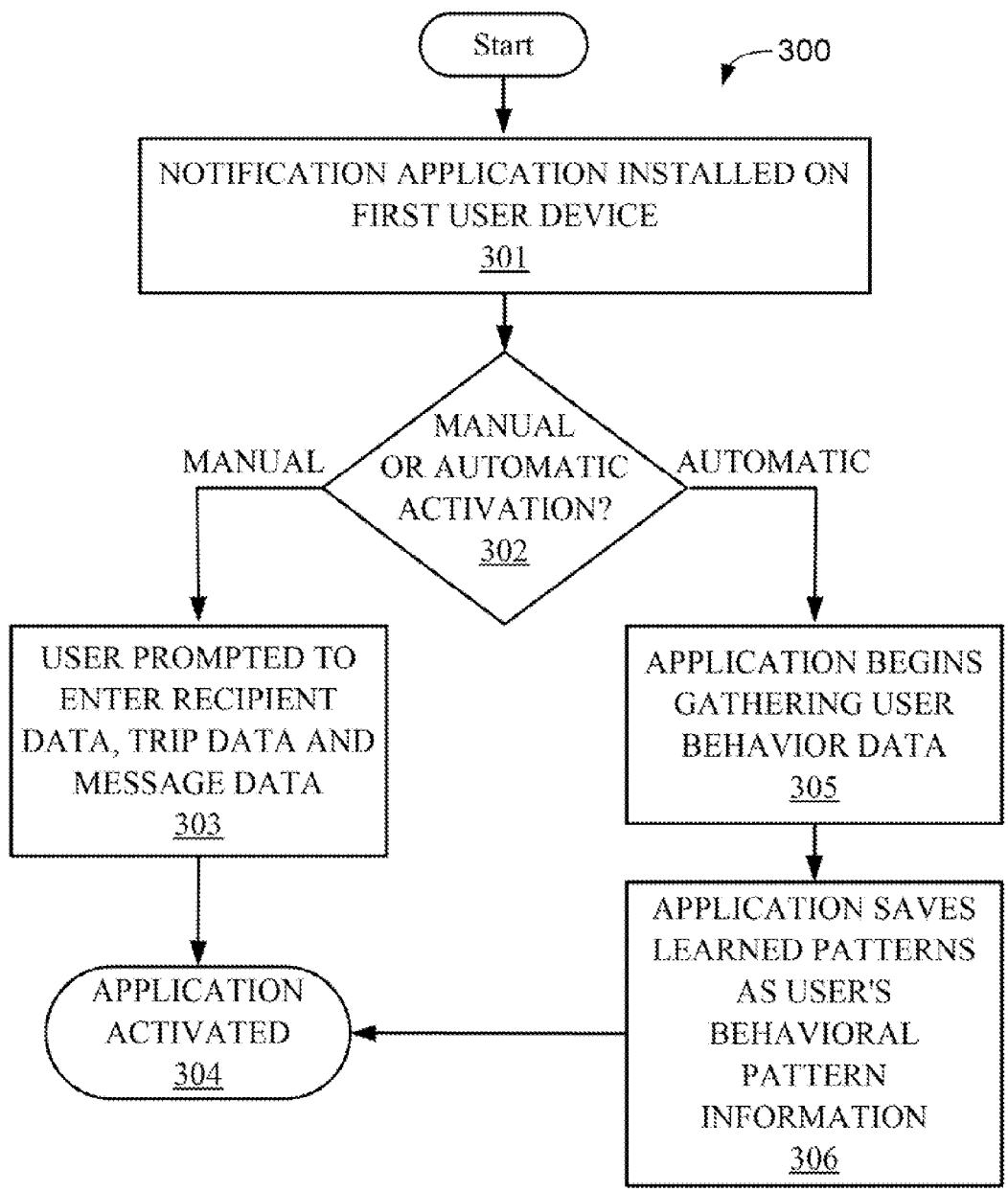
FIG. 3 is a flowchart showing a process of activating a notification application in accordance with various embodiments of the disclosed principles.

Referring now to FIG. 3, this figure is a flowchart of an example process 300 for providing a context-based notification service from a first user device relative to a second user device via a notification application hosted on the first user device.

The process 300 begins at stage 301 wherein the notification application is installed on the first user device. The installation may take place via a physical installation or download installation, e.g., from an online application store, depending on user or vendor preferences. At this point, the notification application code is installed on the first user device and may run on the device; however the application is not yet activated for use to send notifications.

At stage 302 of the process 300, the user selects an activation option from the options of manual and automatic. It will be appreciated that in alternative embodiments, the user may not have a choice of activation modes, or only a single mode of activation may be provided.

If the user chooses a manual mode of activation, then he is prompted at stage 303 to enter recipient data, such as cell number and email address, trip data, such as meeting location and estimated time to travel from the notification point to the meeting location, and message data such as message template and notification-mechanism preference. At stage 304, the notification application is activated.

If the user instead chooses the automatic mode of activation, then the application begins gathering data at stage 305 for a predetermined period of time. In an alternative embodiment, the application may gather data until a certain amount or variety of data can be gathered. Whatever the length of the data-gathering period, this period can be referred to as the learning period. During the learning period, the application does not send notifications but does observe the user's travelling, calling, and texting patterns to identify repeated trips and associated notifications to one or more common recipients.

When the learning period expires, the application saves the learned patterns at stage 306 as the user's behavioral-pattern information upon which to base future notification actions, and the application is activated at stage 304. Thus, upon launching, the application now has all the required information pre-populated based on the user-pattern it has observed during the learning period. This means that the user simply needs to activate the application once. Note that there can be multiple such auto-notification requests by the user.

During the learning period or during the early period of actual use, the notification application may seek confirmation from the first user before moving into a mode of automatically sending notifications. For example, the application may ask the first user before a first notification is sent to a particular user: "You are 6 minutes from the weekday morning meeting point at your present speed. Would you like me to text Ted?"

Figure 4:
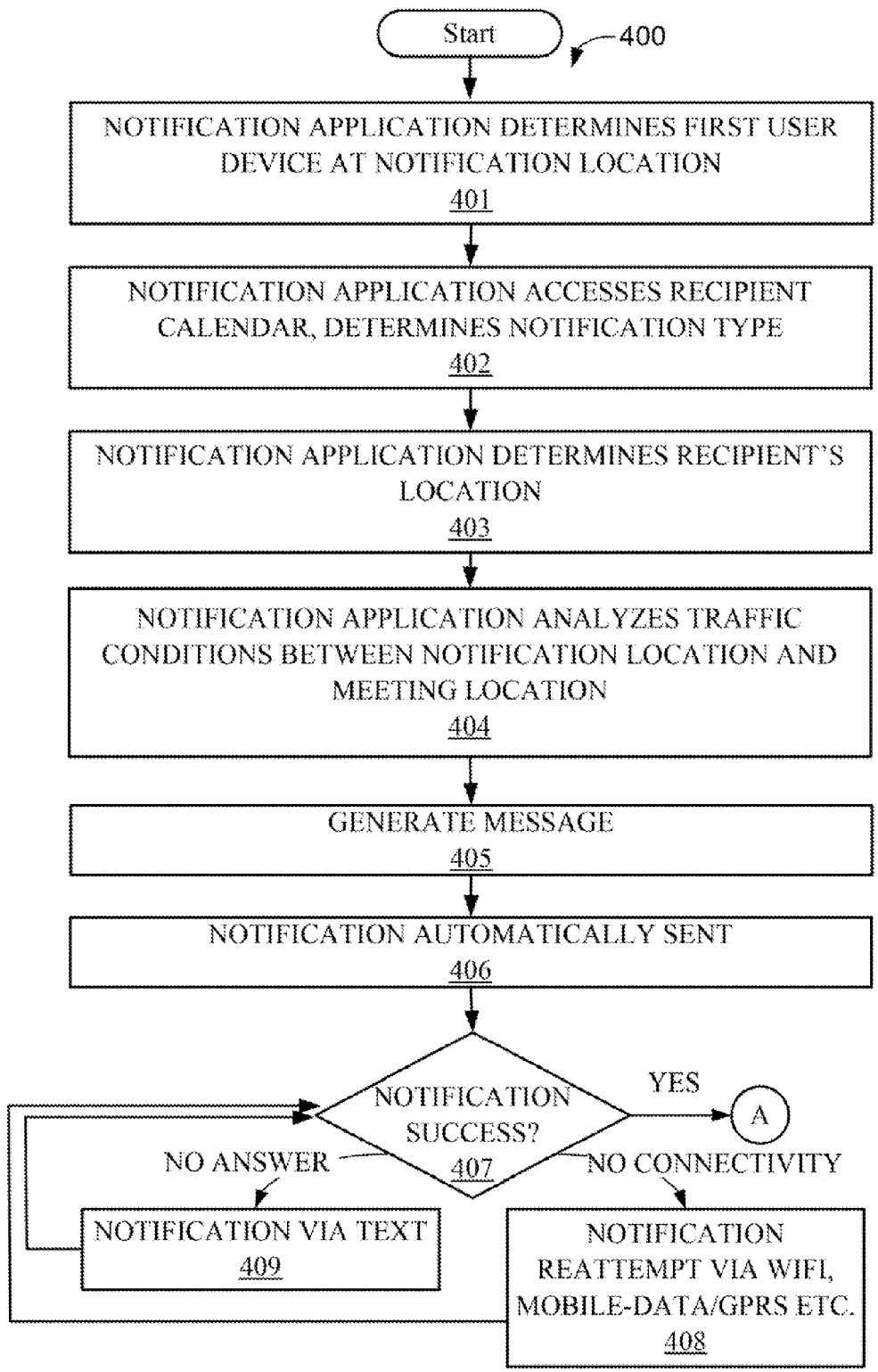
FIGS. 4 and 5 together form a flowchart showing a process of generating a context-based notification to a recipient in accordance with various embodiments of the disclosed principles.

In an embodiment, when the user reaches the set notification location, the now-activated notification application performs several steps leading up to performing an auto-notification if warranted. An example of this process is shown in the flowchart 400 of FIGS. 4 and 5.

The illustrated process 400 begins at stage 401, wherein the notification application determines that the first user device is at the notification location (as set by the user during manual activation or observed by the application during automatic activation). It will be appreciated that the user and user device may be literally "at" the location for only a fraction of a second, and that being "at" the location for purposes of the notification application means being literally at, nearly at, or just beyond, such that the time to the meeting point remains substantially the same as expected.

At stage 402, the notification application accesses and checks the calendar of the recipient to determine the type of notification to use. This step may be skipped if the user or recipient has specified a preferred notification type to use as a default. For example, if the recipient's calendar indicates that the recipient has a meeting scheduled at the time of the notification, then a text notification may be more appropriate than a call notification. However, if the user or recipient has requested that all notifications be by call, then a call notification is deemed to be more suitable.

The application may then further determine the recipient's actual location at stage 403, e.g., by sending a silent location request to the recipient's device to determine if the recipient is out of the office, travelling, or is within meeting distance of the meeting location. If the recipient is not in town or is otherwise not close enough to the meeting location to make the meeting, then there is no need to send a notification.

In an embodiment, the application also analyzes traffic conditions between the notification location and the meeting location at stage 404 to determine whether the predetermined notification lead time to reach the meeting location is actually accurate, and adjusts the timing of the notification message accordingly. If a notification is to be sent, then the process 400 moves to stage 405.

At stage 405, a message is generated, and a notification is automatically sent at stage 406 based on the type of notification determined. For example, if the type of notification is selected or determined to be "Call," then the device's TTS Engine may be used to generate speech for the message created. This speech output can be saved in a temporary audio file which can be used in an auto-call once the call is established with the recipient. If the type of notification is selected to be "Text Message," or if the user has set the preferred notification type as "Text Message," then the device may use the created message built to send a message to the recipient using the native default messaging application.

In an embodiment, the auto-notify service accommodates situations wherein the user's device is not able to notify the recipient (due to network unavailability, failure to answer, or other reason). In such cases, the application defers to another notification mechanism depending on the reason for notification failure. For example, if the reason for notification failure is that the call was simply not answered, then a text message may be sent, whereas if the reason for notification failure is an apparent lack of connectivity or that the target device is not on, then a message which can be accessed over a non-cellular network (e.g., via an email message, a TextFree message, etc.) may be sent.

At stage 407, the notification application determines whether the notification was successfully sent. If the notification was successfully sent, then the process continues to point "A" of FIG. 5. If it is determined that the notification failed for lack of connectivity, then the process 400 flows to stage 408, wherein the notification application resends the notification in a manner in which it can be accessed via either a non-cellular network, e.g., WiFi or WLAN, or a cellular network e.g., mobile-data or GPRS. If it is instead determined that the reason for the notification failure is that the call was not answered, then at stage 409 the notification application transmits a text message to the recipient. From stage 408 or 409, the process 400 returns to stage 407, whereupon the process moves to transition A if the notification was successful.

Figure 5:
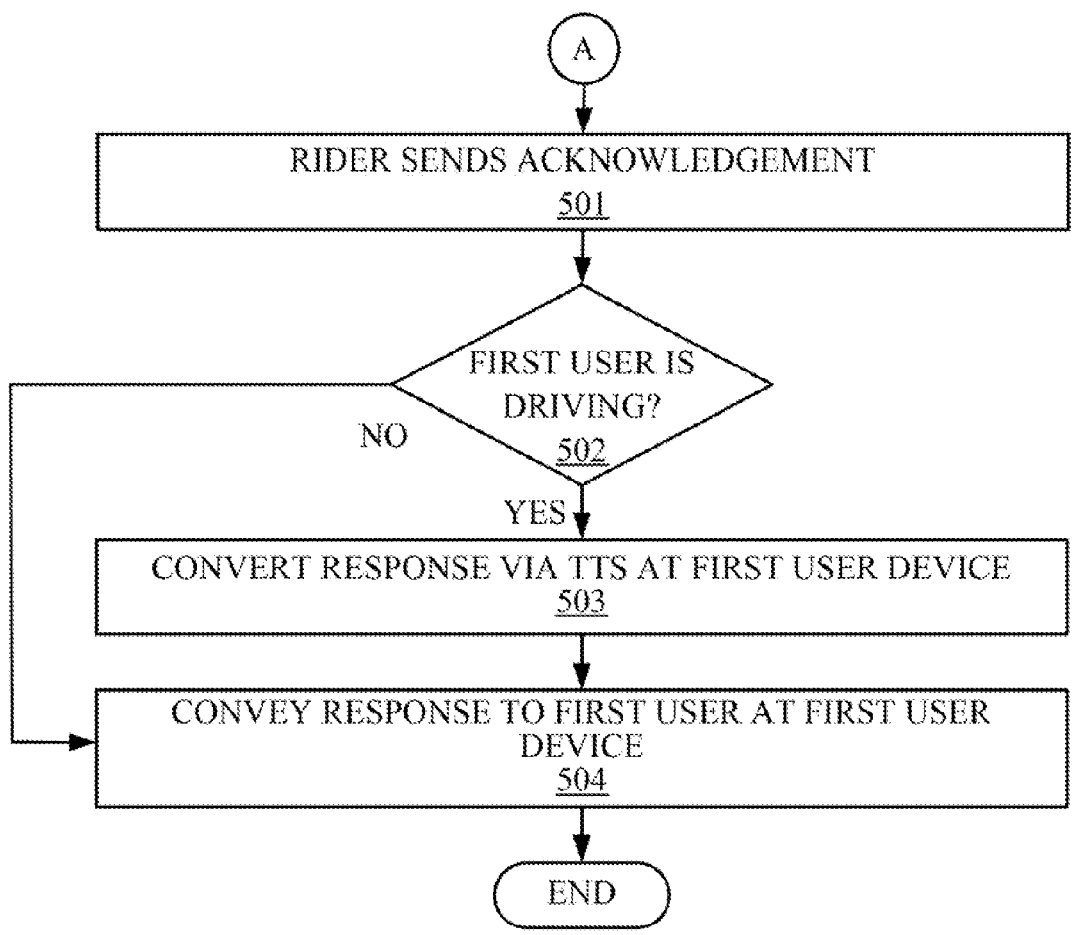

Turning to FIG. 5, the rider, having received the notification, responds to the first user at stage 501. At stage 502, the first user device determines whether the first user is driving, in which case the first user device converts the incoming response to speech via TTS, for example at stage 503. Otherwise the process 500 proceeds directly to stage 504. At stage 504 the first user device conveys the rider's response to the first user. The rider's response may be any appropriate response such as a simple OK, a request to wait for 5 minutes once the first user arrives, an indication that the rider will not be able to reach the rendezvous point and for the driver to carry on without the rider, and so on.

The conveyance mechanism may vary; for example, if 503 was executed then the rider's response is conveyed through a speech message. Otherwise, the response is manifest to the driver using the current device settings on the first device, e.g., there may be an audible notification as well as an icon indicating that there is a message.

It should be noted that not every message from the rider is converted to a voice message at the driver side when he is driving. Rather, context information regarding when the notification was sent from the first user device and when the response was received from the second user device at the first user device is used to set the notification mode. In an embodiment, the response is converted, e.g., via TTS, as the user is driving only if the difference between these two times is within a threshold (e.g., the maximum time that it would take for the driver to reach the meeting point).

For example, consider the case wherein it is a Friday evening, and the driver notifies the rider, the rider responds, the response is converted to speech, and the rider gets picked up. Now on Saturday, the rider casually sends a message to the driver, and coincidentally the driver is driving to a movie or a family outing. In this case, the message from the rider to the driver is not treated as a response to the notification sent the previous day, and hence no TTS conversion is performed while the driver is driving (unless the driver's phone is set to convert all messages to voice messages while driving).

In view of the many possible embodiments to which the principles of the present disclosure may be applied, it should be recognized that the embodiments described herein with respect to the drawing figures are meant to be illustrative only and should not be taken as limiting the scope of the claims. Therefore, the techniques as described herein contemplate all such embodiments as may come within the scope of the following claims and equivalents thereof.

I claim:

1. A method comprising;
    determining, by a first computing device, that the first computing device is at a predetermined notification point that lies an expected amount of time from a meeting point, wherein the expected amount of time is based at least in part on a time of day;
    determining, by the first computing device and based on current travel conditions, whether travel from the notification point to the meeting point will take longer than the expected amount of time;
    responsive to determining that travel from the notification point to the meeting point will take longer than the expected amount of time, adjusting, by the first computing device, a time at which the first computing device will send a notification to a second computing device from a first time to a second time, wherein the second time is later than the first time, and wherein the notification indicates the first computing device is the expected amount of time from the meeting point; and
    at the second time, automatically transmitting, by the first computing device, the notification to the second computing device.

2. The method of claim 1, wherein automatically transmitting the notification from the first computing device to the second computing device is responsive to determining, by the first computing device, that the second computing device is within a predetermined proximity of the meeting point.

3. The method of claim 2, wherein the predetermined proximity is selected such that a user of the second computing device is able to travel from within the predetermined proximity to the meeting point within the expected amount of time.

4. The method of claim 1, further comprising determining, by the first computing device, that the notification was not received at the second computing device.

5. The method of claim 4, wherein determining that the notification was not received at the second computing device comprises, determining, by the first comprising device, that the notification was not received at the second computing device due to loss of cellular connectivity, the method further comprising:
    responsive to determining that the notification was not received due to loss of cellular connective, retransmitting, by the first computing device and to the second computing device, the notification in such a manner that the notification can be accessed over a non-cellular medium.

6. The method of claim 5, wherein the non-cellular medium includes one of WiFi or a wireless local area network.

7. The method of claim 4, wherein the notification is transmitted as a call; the method further comprising:
    determining, by the first computing device, that the notification was not received at the second computing device because the call was not answered; and
    responsive to determining that the notification was not received because the call was not answered, retransmitting, by the first computing device and to the second computing device, the notification as a text.

8. The method of claim 1, wherein automatically transmitting the notification comprises determining, by the first comprising device, based on user context, how to send the notification.

9. The method of claim 8, wherein determining how to send the notification includes:
    checking, by the first computing device, a calendar associated with a user of the second computing device; and
    in response to determining that the calendar associated with the user of the second computing device indicates the user of the second computing device is in a meeting, determining, by the first computing device, to send the notification as a text notification.

10. A first computing device comprising:
a processor; and
a memory comprising instructions that, when executed by the processor, cause the processor to:
  determine that the first computing device is at a predetermined notification point that lies an expected amount of time from a meeting point, wherein the expected amount of time is based at least in part on a time of day;
  determine, based on current travel conditions whether travel from the notification point to the meeting point will take longer than the expected amount of time;
  responsive to determining that travel from the notification point to the meeting point will take longer than the expected amount of time, adjust a time at which the first computing device will send a notification to a second computing device from a first time to a second time, wherein the second time is later than the firs time, and wherein the notification indicates that the first computing device is the expected amount of time from the meeting point; and
  at the second time, automatically transmitting the notification to the second computing device.

11. The first computing device of claim 10, wherein the instructions, when executed by the processor, further cause the processor to determine that the notification was not received at the second computing device.

12. The first computing device of claim 11, wherein the instructions, when executed by the processor, further cause the processor to:
  determine that the notification was not received at the second computing device due to loss of cellular connectivity; and
  responsive to determining that the notification was not received due to loss of cellular connectivity, retransmit the notification in such a manner that the notification can be accessed over a non-cellular network.

13. The first computing device of claim 11, wherein the notification is transmitted as a call, and wherein instructions, when executed by the processor, further cause the processor to:
  determine that the notification was not received at the second computing device because the cell was not answered; and
  responsive to determining that the notification was not received because the call was not answered, retransmit the notification as a text.

14. The first computing device of claim 10, wherein the instructions, when executed by the processor, further cause the processor to determine, based on user context, how to send the notification.

15. The first computing device of claim 14, wherein the instructions, when executed by the processor, cause the processor to determine how to send the notification at least by:
  checking a calendar associated with a user of the second computing device; and
  in response to determining that the calendar associated with the user of the second computing device indicates the user of the second computing device is in a meeting, determining to send the notification as a text notification.

16. A non-transitory computer-readable storage medium encoded with instructions, that, when executed, cause a processor of a first computing device to:
  determine that the first computing device is at a predetermined notification point that lies an expected amount of time from a meeting point, wherein the expected amount of time is based at least in part on a time of day;
  determine, based on current travel conditions whether travel from the notification point to the meeting point will take longer than the expected amount of time;
  responsive to determining that travel from the notification point to the meeting point will take longer than the expected amount of time, adjust a time at which the first computing device will send a notification to a second computing device from a first time to a second time, wherein the second time is later than the first time, and wherein the notification indicates that the first computing device is the expected amount of time from the meeting point; and
  at the second time, automatically transmitting the notification to the second computing device.

17. The non-transitory computer-readable storage medium of claim 16, further encoded with instructions that, when executed, cause the processor to determine that the notification was not received at the second computing device.

18. The non-transitory computer-readable storage medium of claim 17, further encoded with instructions that, when executed, cause the processor to:
  determine that the notification was not received at the second computing device due to loss of cellular connectivity; and
  responsive to determining that the notification was not received due to loss of cellular connectivity, retransmit the notification is such a manner that the notification can be accessed over a non-cellular network.

19. The non-transitory computer-readable storage medium of claim 16, further encoded with instructions that, when executed, cause the processor to automatically transmit a notification from the first computing device to the second computing device in response to determining that the second computing device is within a predetermined proximity of the meeting point.

20. The non-transitory computer-readable storage medium of claim 16, further encoded with instructions that, when executed, cause the processor to determine, based on user context, how to send the notification.

* * * * *

UNITED STATES PATENT AND TRADEMARK OFFICE
CERTIFICATE OF CORRECTION

PATENT NO. : 9,503,516 B2
APPLICATION NO. : 14/452590
DATED : November 22, 2016
INVENTOR(S) : Nidhi Agarwal Page 1 of 1

It is certified that error appears in the above-identified patent and that said Letters Patent is hereby corrected as shown below:

Column 8, Line 33 (Claim 5): "first comprising device" should read --first computing device--

Column 8, Line 57 (Claim 8): "comprising device" should read --computing device--

Column 9, Line 19 (Claim 10): "the firs time" should read --the first time--

Column 9, Line 43 (Claim 13): "because the cell" should read --because the call--

Signed and Sealed this
Fourth Day of April, 2017

Michelle K. Lee
*Director of the United States Patent and Trademark Office*